(12) United States Patent
Weis

(10) Patent No.: US 6,526,844 B1
(45) Date of Patent: Mar. 4, 2003

(54) MODULE WITH FORCE HYSTERESIS

(75) Inventor: Christian Weis, Mainz (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/514,196

(22) Filed: Feb. 24, 2000

(30) Foreign Application Priority Data

Mar. 4, 1999 (DE) .......................................... 199 09 476

(51) Int. Cl.⁷ .............................. G05G 1/14; F16D 63/00
(52) U.S. Cl. ............................... 74/513; 74/512; 188/83
(58) Field of Search ........................ 74/512, 513, 527, 74/529, 531, 532, 564; 188/83; 192/45; 280/298, 301

(56) References Cited

U.S. PATENT DOCUMENTS

| | | | | |
|---|---|---|---|---|
| 3,086,632 A | * | 4/1963 | Wade et al. ................... | 192/45 |
| 5,309,784 A | * | 5/1994 | Kobayashi et al. .......  | 74/473.27 |
| 5,819,593 A | * | 10/1998 | Rixon et al. ................... | 74/514 |
| 5,979,269 A | * | 11/1999 | Su-Chen ...................... | 280/291 |
| 6,003,404 A | * | 12/1999 | Hannewald ................... | 74/512 |
| 6,129,370 A | * | 10/2000 | Hsieh et al. ................. | 280/291 |
| 6,142,499 A | * | 11/2000 | Hsieh et al. ................. | 180/219 |
| 6,186,025 B1 | * | 2/2001 | Engelgau et al. ............. | 74/512 |
| 6,263,758 B1 | * | 7/2001 | Kumamoto et al. .......... | 74/513 |
| 6,289,762 B1 | * | 9/2001 | Silva ............................ | 74/513 |

FOREIGN PATENT DOCUMENTS

| | | | | |
|---|---|---|---|---|
| DE | 195 17 172 A1 | 5/1995 | ........... | F02D/11/02 |
| DE | 19755098 | 6/1999 | | |
| EP | 0 748 713 A2 | 6/1996 | ........... | B60K/26/02 |
| EP | 0 899 147 A1 | 8/1998 | ........... | B60K/26/02 |
| EP | 0 923 015 A2 | 10/1998 | ........... | G05G/1/14 |

\* cited by examiner

Primary Examiner—David A. Bucci
Assistant Examiner—Justin Stefanon
(74) Attorney, Agent, or Firm—Mayer, Brown, Rowe & Maw

(57) ABSTRACT

The module (10) serves for producing a force hysteresis during pivoting of a rotary element (14, 16) which is mounted rotatably in a housing (12) and on which there is secured at least one spring element (20), of which the free end slides, via a friction element (18), on a stationary friction surface (22). In order for it not to be necessary to rely on separate restoring mechanisms, it is proposed that, in all the angled positions of the rotary element (14, 16) relative to the housing (12), the reaction force of the spring element (22) subjects the rotary element (14, 16) to a restoring moment about the rotary spindle (24). Such a module (10), with a compact construction, makes it possible, with the aid of a spring element (20), to produce both the restoring forces and the frictional forces necessary for the hysteresis.

6 Claims, 3 Drawing Sheets

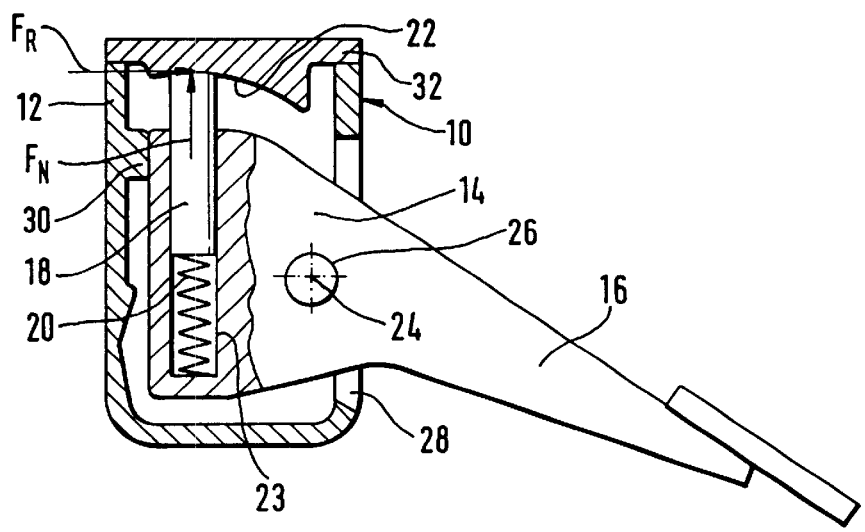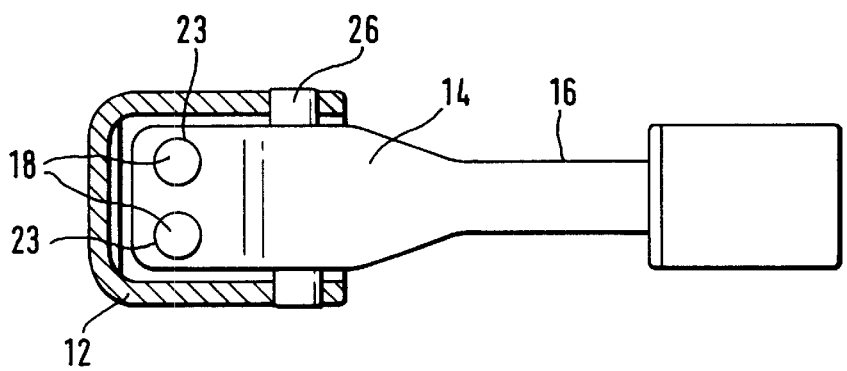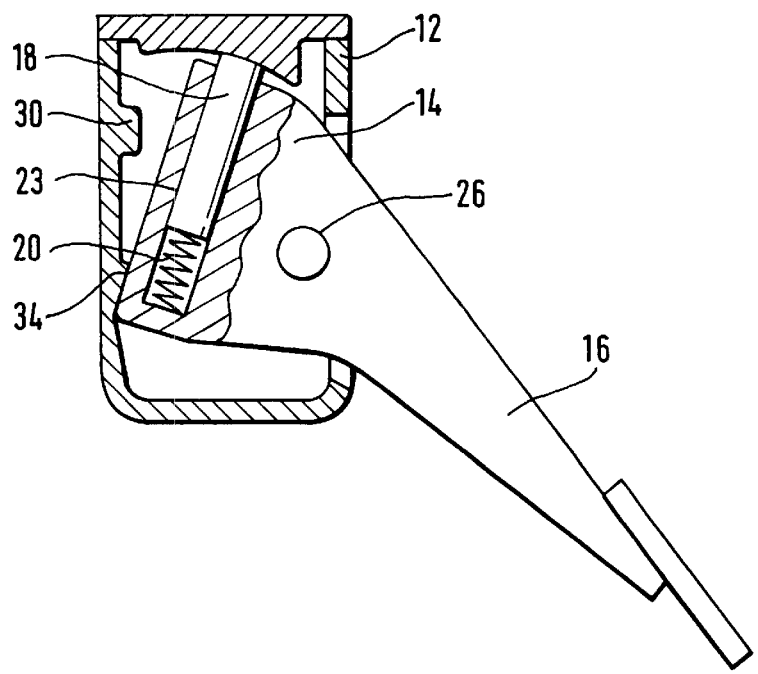

MODULE WITH FORCE HYSTERESIS

FIELD OF INVENTION

The invention relates to a module for producing a force hysteresis during pivoting of a rotary element which is mounted rotatably in a housing and on which there is secured at least one spring element, of which the free end slides, via a friction element, on a stationary friction surface.

Such modules are used, for example, in so-called "drive-by-wire" systems, to simulate the frictional forces which are known from the hitherto conventional cable-control mechanisms, and result in a force hysteresis when the rotatably mounted elements are pivoted, in order to maintain the familiar actuating characteristics for the operator.

DESCRIPTION OF RELATED ART

In addition to very high-outlay solutions as are known, for example, from German Patent Application 197 37 289.9, of which the complicated mechanical construction is expensive to produce and susceptible to malfunctioning during operation, a module of the type mentioned in the introduction is known from German Patent Application 198 48 091. Such a module can be arranged in addition, in the case of an actuating element provided with a restoring spring, in order to produce the desired force hysteresis. This previously known solution thus always requires two separate springs for producing the hysteresis and the restoring force. The larger number of components and the resulting higher installation outlay render the production more expensive.

THE OBJECT OF THE INVENTION

The object of the invention is to provide a module which is intended for producing a force hysteresis and makes it possible to restore the rotary element with low design outlay.

The object is achieved according to the invention by a module of the type described in the introduction, in the case of which, in all the angled positions of the rotary element relative to the housing, the reaction force of the spring element subjects the rotary element to a restoring moment about the rotary spindle.

BRIEF SUMMARY OF THE INVENTION

The module according to the invention provides the advantage that the spring element, on the one hand, produces the necessary restoring moment about the rotary spindle and, on the other hand, brings about the force which is necessary for producing the frictional forces and causes the friction element to butt against the friction surface. In addition to the reduction in the number of parts, which allows more cost-effective production, there is also a reduction, in relation to the hitherto known modules for producing a force hysteresis, in the amount of space required by the solution according to the invention. The level of the restoring moment and its relationship with the frictional forces produced may be achieved by different degrees of prestressing of the spring element, different geometries and/or by changing the friction-element/friction-surface friction pairing. Of course, the frictional force is only of such a magnitude that it does not obstruct to any great extent the restoring movement of the torque under the restoring forces.

In the case of many applications, it is desired for the restoring moment and/or the force hysteresis to be varied in dependence on the relative angle-of-rotation position of the rotary element. This can easily be achieved, in the case of an advantageous embodiment of the invention, in that the friction surface is arranged such that it curves with a changing radius about the rotary spindle. Corresponding curvatures make it possible to achieve regressive and progressive characteristic curves of the restoring force with changing levels of hysteresis. In a particularly straightforward embodiment of the invention, the housing contour forms the friction surface.

A preferred embodiment of the invention provides that the friction element is guided in a linearly displaceable manner in a guide of the rotary element, the guide path being located on a straight line running at a certain distance from the rotary spindle.

The eccentric arrangement of the guide path means that the reaction force of the abutment force of the friction element on the friction surface results in a restoring moment about the rotary spindle. It is conceivable, in principle, for the friction element also to be guided in a curved guide, in which case the tangents to the guide path should not intersect the rotary spindle in any angled position of the rotary element. In all the angle-of-rotation positions, the guides of the friction elements thus ensure a precisely defined restoring moment and precise abutment of the friction element against the friction surface.

The friction element may be guided, for example, in that the friction element is seated in a guide bore in the rotary element, said guide bore being adapted to the cross section of the friction element. This results in particularly uniform and low-friction guidance of the friction element, which ensures a constant contact-pressure force of the friction element on the friction surface.

A further preferred embodiment of the invention provides that the friction element is guided in a rotationally fixed manner in the guide bore. The rotationally fixed guidance may be achieved, for example, by a nose which extends in a groove formed in the longitudinal direction of the guide. Oval or polygonal cross sections of the guide bore may likewise prevent rotation, but involve higher outlay to produce. The rotationally fixed guidance ensures constant abutment of the friction element against the friction surface, this counteracting excessive wear of the friction partners and allowing the frictional forces to remain constant to the greatest possible extent during operation.

A further preferred embodiment of the invention provides that the spring element is a helical spring which is subjected to compressive loading and is seated in the guide of the friction element.

In the case of cylindrical guide bores, in particular, a very straightforward construction of the module is achieved since the guide bore for the friction element may simultaneously form the means for receiving the spring element. The operation of installing such a module is also very straightforward.

Two spring elements are preferably provided for redundancy.

A redundant system ensures that, even if a spring element fails, there is still a sufficiently high restoring moment available in order to restore the rotary element into its rest position. This avoids the situation where, following the rupture of a spring, an actuating element which is coupled to the rotary element remains in an operating position, this possibly resulting in malfunctioning. An example of such an actuating element is the gas pedal of a motor vehicle, which gas pedal must, in all circumstances, be restored into the idling position since, otherwise, dangerous situations could arise from the engine continuing to run under load.

The gas pedal or some other actuating element may be fitted or integrally formed directly on the rotary element. In the case of large numbers, in particular, such a module constitutes a variant which can be produced particularly cost-effectively. However, it is likewise conceivable for the housing to be sealed and to have a projecting shaft to which an actuating element can be coupled. Such a variant may be freely combined with different actuating elements and in addition, by virtue of the closed housing, provides the advantage that it is not possible for any dirt penetrating from the outside to settle on the friction surfaces or on the contact paths of a sensor which may possibly be provided for sensing the angle-of-rotation position.

The friction element preferably has a stop which, in the event of excessive wear of the friction element, interacts with a housing-side stop projecting into the pivot path thereof. Such a stop prevents the situation where, following a relatively long period of operation and inadequate maintenance, the friction-element wear is so severe that the friction lining of the friction element is totally worn and this results in further damage, or that, on account of a spring which is relieved of stressing to an inadmissibly pronounced extent, the restoring moment acting on the rotary element decreases to such an extent that a satisfactory restoring operation is no longer reliably provided. The limitation provided by the stop ensures that the spring is supported directly on the stop and the necessary minimum restoring moment is ensured as a result. Since the force hysteresis is selected predominantly with comfort in mind, a drop in the hysteresis action is accepted for safety reasons in the case of wear, which is inadmissible per se. A stop may also be expedient when a force hysteresis is only desired in any case in a limited angle range. With a corresponding configuration of the friction surface, the spring element may be supported on the stop over a certain angle range, while, in a further angle range, there is abutment of the friction element on the friction surface under the load of the spring element.

The stops are preferably located in a position in relation to one another which during pivoting of the rotary element, in the abutment region, essentially avoids relative movement between the stop surfaces. This avoids frictional movements which could result in wear of the stop surfaces themselves.

BRIEF DESCRIPTION OF THE DRAWINGS

A number of exemplary embodiments of the invention are described in more detail hereinbelow with reference to the attached drawings, in which:

FIG. 1 shows a section through a force-hysteresis module with a gas pedal,

FIG. 2 shows a cross section of the module according to FIG. 1,

FIG. 3 shows a module according to FIG. 1 in the full-load position,

DETAILED DESCRIPTION OF THE INVENTION

Figure 5:
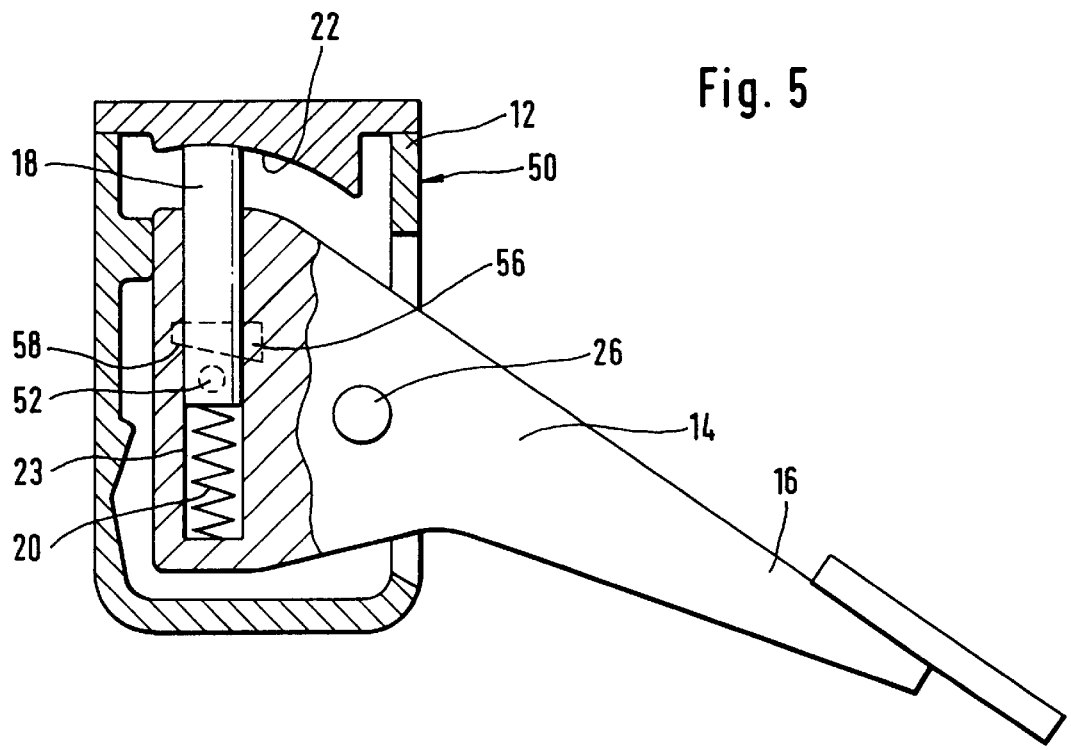
FIG. 5 shows a section through a force-hysteresis module with a wear stop.

FIG. 1 illustrates a force-hysteresis module 10 which essentially comprises a housing 12, a rotary element 14, which is mounted pivotably in said housing and has a gas-pedal lever 16 integrally formed on it, and two friction elements 18, which are guided in a linearly displaceable manner in the rotary element 14 and, under the load of two helical springs 20, butt against a friction surface 22 on the inside of the housing 12 (see also FIG. 2). The friction elements 18 and the helical springs 20 are seated in guide bores 23, of which the eccentric positions ensure the necessary restoring moment of the rotary element 14 of the gas pedal 16. The capacity of the gas pedal 16 for pivoting about the rotary spindle 24, which is formed by a bolt 26 (see also FIG. 2), is ensured by a housing opening 28.

In the idling position of the gas pedal 16, which is illustrated in FIG. 1, the rotary element 14 butts against an idling stop 30, which is formed on a wall of the housing 12.

The friction surface 22 is formed by the inner contour of a housing cover 32 and is arranged such that the restoring moment produced by the normal force $F_N$ is smaller than the friction moment produced by the frictional force $F_R$, this ensuring that the gas pedal 16 is always restored into the idling position, illustrated in FIG. 1. The friction surface 22 is curved in the direction of the rotary spindle 24 such that actuation of the gas pedal in the direction of the full-load position, which is illustrated in FIG. 3 and in which the rotary element 14 is positioned against a full-load stop 34, results in a compression of the helical springs 20 and thus in an increase in the normal force $F_N$. Since there is a reduction in the effective distance between the frictional force $F_R$ and the rotary spindle 24, the friction moment acting about the rotary spindle 24 does not change in accordance with the restoring moment produced by the normal force. Suitable curvature of the friction surface 22 thus makes it possible to achieve desired actuating characteristics of the gas pedal 16 between the idling stop and the full-load stop.

It can be seen from the cross section in FIG. 2 that the force-hysteresis module 10 has two helical springs 20 which are arranged for redundancy one beside the other an d have associated friction elements 18 which, in the event of failure, provide emergency running properties and, even if a helical spring 20 ruptures, ensures that the gas pedal 16 is restored into the idling position.

Figure 4:
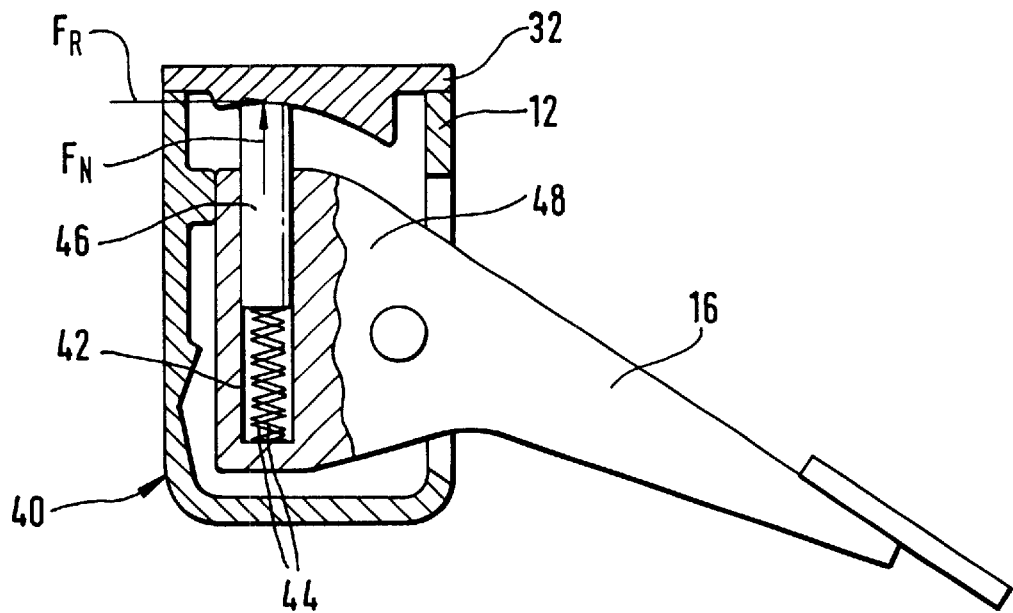
FIG. 4 shows a cross section of a module similar to FIG. 1 with spring elements arranged for redundancy.

A further embodiment of a force-hysteresis module 40 is illustrated in FIG. 4. In the case of this module 40, the redundancy of the system is ensured by two helical springs 44 which are installed one inside the other or one beside the other in a guide bore 42 and both act on a single friction element 46. The force-hysteresis module 40 is of even more compact construction than the force-hysteresis module 10, illustrated in FIGS. 1 and 2, and is even more cost-effective to produce since it manages with a single friction element 46 and it is necessary to produce just one guide bore 42 in the rotary element 48.

Figure 6:
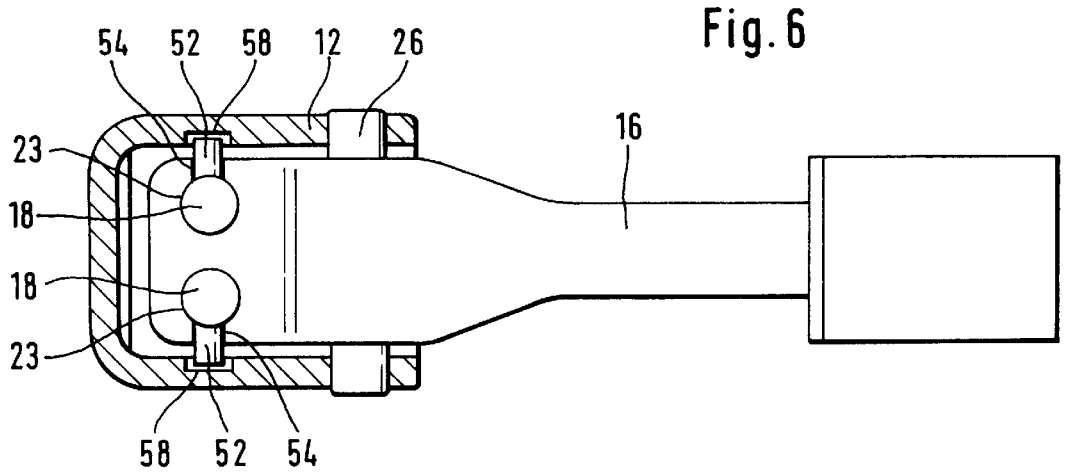
FIG. 6 shows a cross section of the module according to FIG. 5.

FIGS. 5 and 6 illustrate a further embodiment 50 of a force-hysteresis module, the basic construction of which corresponds to the force-hysteresis module 10 according to FIGS. 1 and 2.

In each case one stop bolt 52 is integrally formed laterally on the two friction elements 18, lateral grooves 54 in the rotary element 14 ensuring the unchanged capacity of the friction elements 18 for displacement in the guide bores 23. Integrally formed on the side flanks of the housing 12 are stops 56 which, as seen in the spring-expansion direction, are located in the movement path of the stop bolts 52. The stops 56 may also constitute the top edges of grooves 58 made laterally in the housing walls. In the event of excessive wear of the friction elements 18, which results in the helical springs 20 expanding to a more pronounced extent, the stop pairings 52, 56 prevent said helical springs from being further relieved of stressing beyond a certain maximum level. This ensures a minimum restoring moment even when friction elements 18 are worn, it merely being the case that the hysteresis action decreases first of all in the region of the idling position and, as wear increases, also in the direction of the full-load position. The edges 58 of the stops 56 are arranged with a certain inclination in the pivot path of the stop bolts 52, with the result that during pivoting of the gas pedal 16, while the stop bolts 52 are in abutment against the stop edges 58, there is only very slight relative movement between the bolts 52 and the edges 58, in order to avoid wear thereof.

Figure 7:
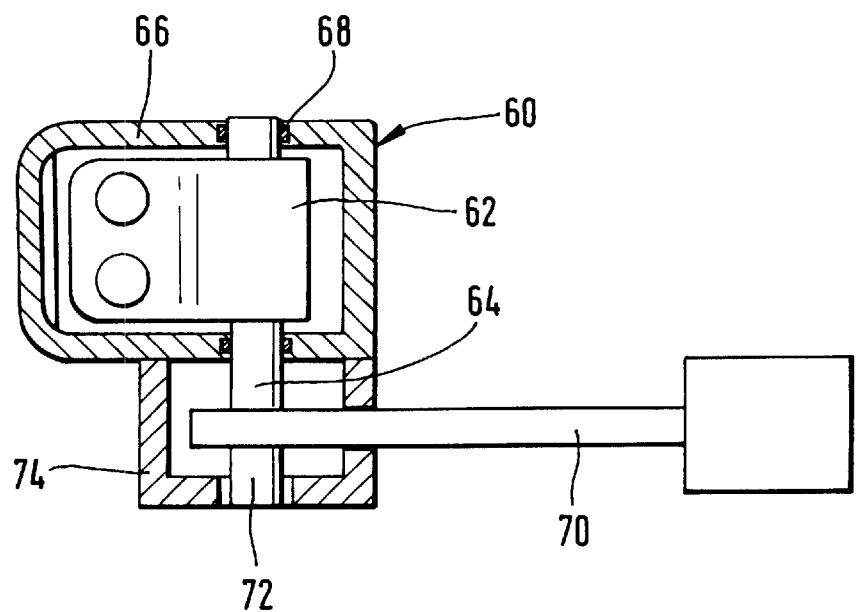
FIG. 7 shows a cross section of a force-hysteresis module which is independent of the gas pedal.

In the case of the exemplary embodiment 60 of a force-hysteresis module, this being illustrated in FIG. 7, said force-hysteresis module is not designed with a gas pedal integrally formed on it; rather, the rotary element 62 is mounted in the closed housing 66 such that it can be pivoted via a shaft 64. Seals 68 are provided at the bearing locations between the shaft 64 and housing 66 and prevent dirt from penetrating into the housing.

A gas pedal 70 is seated on the end 72 of the shaft 64, said shaft end projecting laterally out of the housing 66. The pedal lever 70 is arranged in a module housing 74 which is arranged laterally on the housing 66 of the force-hysteresis module 60 and, at the same time, forms the idling and full-load stop for the gas-pedal lever 70.

The force-hysteresis module 60, illustrated in FIG. 7, may also easily be combined with other actuating elements for which it is desired to have hysteresis properties for the actuation.

What I claim is

1. A module for producing a force hysteresis during pivoting of a rotary element comprising:
   (a) a housing;
   (b) a rotary element mounted on the housing for rotation about a rotary spindle between starting and operating positions, the rotatable element including a portion located within the housing;
   (c) a stationary friction surface formed on the inside of the housing, which surface curves with a changing radius about the rotary spindle;
   (d) at least one bore in the portion of the rotary element located within the housing, which bore is open in the direction facing the stationery friction surface; and
   (e) a spring biased friction element located in the at least one bore pressing against the curved, stationary friction surface, wherein in all the angled positions of the rotary element relative to the housing, the reaction force of the spring biased friction element subjects the rotary element to a restoring moment about the rotary spindle.

2. The module as claimed in claim 1, wherein a housing contour forms the friction surface.

3. The module as claimed in claim 1, wherein the friction element is mounted in a guide path and guided in a linearly displaceable manner in the bore of the rotary element, the guide path being located on a straight line running at a certain distance from the axis of rotation of the rotary element.

4. The module as claimed in claim 1, wherein two biasing springs elements are provided for redundancy.

5. The module as claimed in claim 2, wherein the friction element (18, 46) has a stop (52) which, in the event of excessive wear of the friction element (18), interacts with a housing-side stop (56, 58) projecting into the pivot path thereof.

6. The module as claimed in claim 5, wherein the stops are located in a position in relation to one another which during pivoting of the rotary element (14), in the abutment region, essentially avoids relative movement between the stop surfaces.

* * * * *